United States Patent [19]

Johnson et al.

[11] Patent Number: 5,267,303
[45] Date of Patent: Nov. 30, 1993

[54] USING A FORM TO REQUEST AUTOMATIC CREATION OF FORM WITH FIELDS FOR REQUESTING OPERATIONS IN RELATION TO ITEMS

[75] Inventors: Walter A. L. Johnson, Santa Clara; Martin F. N. Cooper, Fremont; Z. Erol Smith, III, Palo Alto; Herbert D. Jellinek, Santa Cruz, all of Calif.; Baldo A. Faieta, Quito, Ecuador

[73] Assignee: Xerox Corporation, Stamford, Conn.

[21] Appl. No.: 854,520

[22] Filed: Mar. 20, 1992

[51] Int. Cl.⁵ .................... H04M 11/00; H04N 1/32
[52] U.S. Cl. ................................ 379/100; 358/436; 358/468
[58] Field of Search .................. 379/100, 96–98, 379/93; 358/434, 438, 439, 468, 402, 403

[56] References Cited

U.S. PATENT DOCUMENTS

| | | | |
|---|---|---|---|
| 4,893,333 | 1/1990 | Baran et al. | 379/100 |
| 5,027,224 | 6/1991 | Yamada | 358/434 |
| 5,051,779 | 9/1991 | Hikawa | 355/200 |
| 5,060,980 | 10/1991 | Johnson et al. | 283/70 |
| 5,084,769 | 1/1992 | Miura | 379/100 |
| 5,099,340 | 3/1992 | Kamada et al. | 358/402 |
| 5,153,744 | 10/1992 | Nobuta | 358/403 |
| 5,161,037 | 11/1992 | Saito | 358/434 |

FOREIGN PATENT DOCUMENTS

| | | |
|---|---|---|
| 0376420 | 12/1989 | European Pat. Off. |
| 62-272751 | 11/1987 | Japan |
| 63-95578 | 4/1988 | Japan |
| 63-242060 | 10/1988 | Japan |

OTHER PUBLICATIONS

DoveFax Installation and User's Manual, Dove Computer Corporation. Sep. 1990.

Primary Examiner—Jin F. Ng
Assistant Examiner—Wing F. Chan

[57] ABSTRACT

An automatically created form includes a list of items in relation to which an operation can be performed. A processor creates the form in response to facsimile transmission of another form that includes a field requesting automatic creation of a form. The data defining the image of the requesting form also includes information indicating an image destination, and the automatically created form is transmitted to the indicated destination. The requesting form can be a previously created starter form that is automatically transmitted back to a fax machine in response to an image of a blank sheet or a sheet with simple marks received from the fax machine. The starter form can include a security code as well as fields with check boxes for indicating a set of items to be listed, such as recipients of facsimile transmissions or documents or forms that could be transmitted. The user can mark a check box on the starter form indicating a set of items to request an automatically created form for requesting an operation on one of the set of items. In response, the processor automatically creates a form with a field for each item in the indicated set. When an item's field is marked on the automatically created form, the processor responds by performing the operation in relation to the indicated item.

15 Claims, 9 Drawing Sheets ered form. The field could, for example, be a field
USING A FORM TO REQUEST AUTOMATIC CREATION OF FORM WITH FIELDS FOR REQUESTING OPERATIONS IN RELATION TO ITEMS

BACKGROUND OF THE INVENTION

The present invention relates to forms from which a system obtains information for use in controlling subsequent operations of the system.

Baran et al., U.S. Pat. No. 4,893,333, describe interactive techniques relating to paper selector sheet forms that a user can mark with a pencil or pen to select and retrieve facsimile pages from a shared facsimile data base FAX server system ("FAX server"). A FAX server unit processes a facsimile signal, interprets the selector sheet, and selects pages desired to be retrieved. FIGS. 2a-2e show various selector sheets; as described at col. 7 lines 5-20, a user may obtain information by transmitting a bar code to the FAX server via a FAX transceiver, and the FAX server decodes the bar code and transmits a copy of stored information to the FAX transceiver. FIG. 2f shows a selector sheet for adding data to the FAX server's stored data base; such a sheet could also be used to remove or modify information in the data base. FIG. 2g, as described at col. 8 line 49-col. 9 line 3, shows a follow-up form that a FAX server might provide to a user at the end of a transmission of data pages via a FAX transceiver. As described at col. 3 lines 40-43, at col. 10 lines 12-34, and at col. 15 lines 14-27, 50-52, and 58-62 in relation to FIG. 7b, the user can dial the telephone number of the FAX server and send a blank page; in response, the FAX server immediately returns a blank selector sheet to the user so that the user can fill it in to request pages to be retrieved.

SUMMARY OF THE INVENTION

One aspect of the invention is based on the recognition of a problem in remote interactions with a machine that can transmit and receive data defining images, such as a fax server. A request can be provided to such a machine by transmitting an image of a form requesting a specified operation. The machine can include circuitry for obtaining data defining the requested operation, and the machine could then respond to the request by performing the operation. But a remotely located user may not have an appropriate form to request a desired operation.

Baran et al., U.S. Pat. No. 4,893,333, discussed above, describes a technique in which a fax server responds to a blank sheet by providing a selector sheet for requesting retrieval of stored pages of information. The selector sheet can, for example, include a field for each of a number of stored items. When the fax server transmits a requested item, it can also provide a follow-up form at the end of the transmission. The follow-up form allows the user to request more information by fax, by mail, or by a sales call, and the user can also indicate plans to purchase. But the selector sheet and follow-up form provide minimal information about the stored items and the operations available. As a result, the user cannot make full use of the capabilities of the fax server.

This aspect is further based on the discovery of a technique that dramatically improves a fax server's usefulness. The technique provides a first form that a user can mark and transmit to request automatic creation of a second form. The responding machine, which can be a fax server or other similar machine, has stored data indicating a number of items in relation to any of which a user can request an operation. In response to the first form, the machine automatically creates and transmits a second form that includes a respective field for each of the items. To request an operation in relation to one of the items, a user can then mark the item's field and transmit the marked version of the second form back to the machine.

The technique can be extended so that a user can request any of a number of operations. For example, the first form could indicate one of a number of operations to be requested by the second form. One operation could transmit a set of images such as a document, another could retrieve a set of images, and so forth. In response to the first form, the machine could automatically create a second form for requesting the indicated operation.

The technique can be extended to operations that are performed in relation to more than one category of item. For example, if the operation to be requested is facsimile transmission of a document to a recipient, one category of item could be documents and another could be recipients. To extend the technique to cover one or more categories of items, the first form could indicate one or more of a number of categories of items to be included in the second form. If the first form indicates two categories, documents and recipients, the machine could automatically create a second form that includes one set of fields for indicating documents and another set of fields for indicating recipients.

The technique can be implemented in a system that includes image input circuitry, image output circuitry, memory, and a processor connected for receiving data defining images from the image input circuitry, for providing data defining images to the image output circuitry, and for accessing data stored in the memory. The image input circuitry could be connected to receive facsimile transmissions, and the image output circuitry could be connected to provide facsimile transmissions. The stored data can include data that indicate a number of items in relation to which the processor can perform an operation.

The processor can receive first input image data defining an image of a first form that includes a field that is marked to indicate a request for an automatically created form. The field could, for example, be a field marked to indicate an operation or one or more fields marked to indicate categories of items in relation to which an operation could be performed, such as documents, recipients, and so forth. The first input image data can also include information indicating an image transmission path. For example, the image can include a field that the user can mark to indicate a telephone number of a fax machine, either a fax machine where the user is located or another fax machine to which the automatically created form can be transmitted.

The processor can use the stored data to automatically produce created form data defining an image of a second form that includes a set of fields for each indicated category of items. Each field for a category can include a check box and an identifier of an item from the category. The processor can provide the created form data to the image output circuitry for transmission over the image transmission path. Then, the processor can receive second input image data defining an image of the second form with marks in check boxes indicating items in relation to which an operation is requested. In response, the processor can perform the requested operation in relation to the indicated items.

A machine implementing the invention can include, stored in memory, input instructions for receiving data defining input images, response instructions for responding to input images, and item data indicating a number of items in relation to which the processor can perform an operation. In response to the first input image data, the processor can execute the response instructions to automatically produce the created form data and to provide it for transmission. In response to the second input image data, the processor can execute the response instructions to perform the requested operation in relation to the indicated items.

The invention can also be implemented by an article of manufacture for use in a system that includes a storage medium access device such as a floppy disk drive or a CD drive. The article can include a data storage medium such as a floppy disk or a CD-ROM and data stored by the medium. The stored data can indicate input instructions and response instructions as described above.

A closely related aspect of the invention is based on the recognition that a remotely located user may not have a form with which to request an automatically created form. This problem may arise, for example, when the user uses, loses, or accidentally destroys all available forms.

This problem can be solved by treating an image that does not include a form or a document as a request for a form with which to request an automatically created form. For example, a facsimile transmission of a single blank sheet or of a single sheet with simple marks such as a check mark or an "X" can indicate that the user is requesting an automatically created form. If the facsimile transmission is made from a suitable fax machine, it also includes information indicating the fax machine's telephone number, so that a fax server receiving the transmission can respond by transmitting data defining a form to the fax machine.

This solution can be implemented by storing data defining an initial starter form. The user can store data defining the starter form by interacting with a forms editor. The user could, for example, create a starter form that can be used to request automatic creation of another form for requesting operations. Then, when the server receives the image of a blank sheet or of a sheet with simple marks from a fax machine, it automatically retrieves the data defining the starter form and transmits data defining an image of the starter form to the fax machine.

The following description, the drawings, and the claims further set forth these and other aspects, objects, features, and advantages of the invention.

DETAILED DESCRIPTION

A. Conceptual Framework

Figure 1:
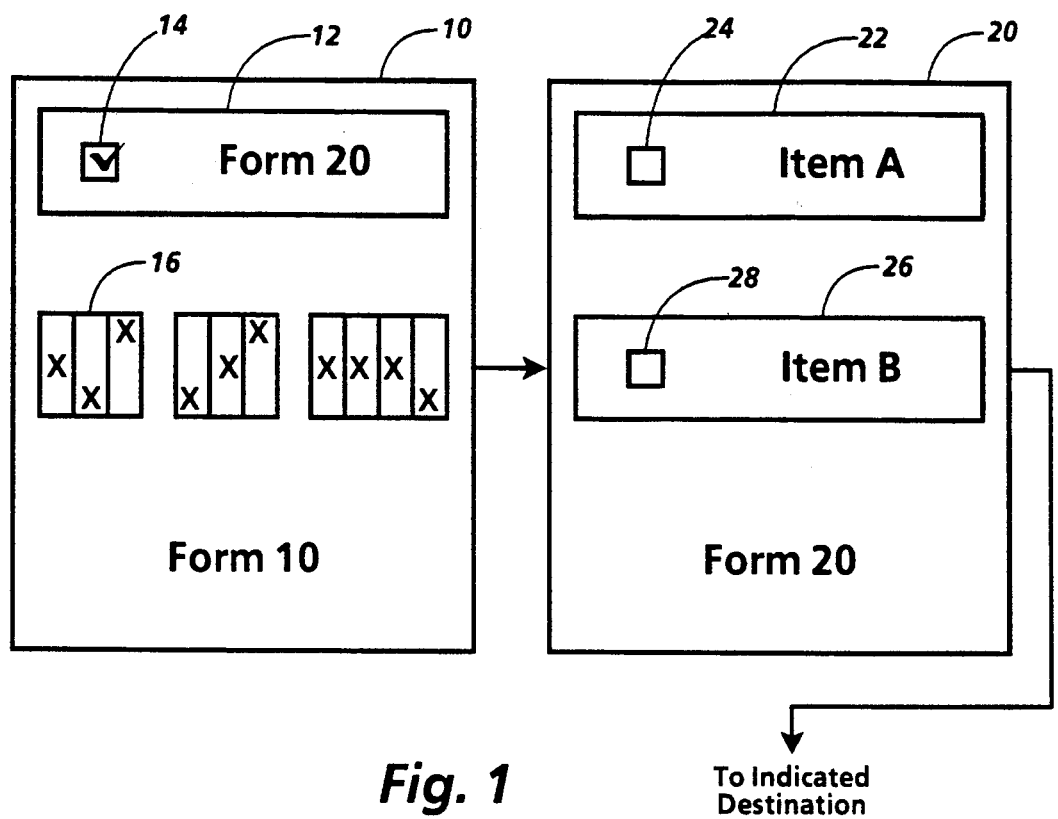
FIG. 1 is a schematic flow diagram showing a form requesting automatic creation of another form and an automatically created form.

The following conceptual framework is helpful in understanding the broad scope of the invention, and the terms defined below have the indicated meanings throughout this application, including the claims.

The term "data" refers herein to signals that indicate or include information. When an item of data can indicate one of a number of possible alternatives, the item of data has one of a number of "values." For example, a binary item of data, also referred to as a "bit," has one of two values, such as "0" and "1" or "ON" and "OFF.".

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any arrangement of matter that can respond to first data at one location or time by providing second data at another location or time.

A "data storage medium" or "storage medium" is a physical medium that can store data. Examples of data storage media include magnetic media such as floppy disks, optical media such as CD-ROMs, and semiconductor media such as semiconductor ROMs and RAMs. As used herein, "storage medium" covers one or more distinct units of a medium that together store a body of data. For example, a set of floppy disks storing a single body of data would be a storage medium.

A "storage medium access device" is a device with circuitry that can access data on a data storage medium. Examples include floppy disk drives and CD-ROM readers.

"Memory" is any component, combination of components, circuitry, or system that can store data, and may include local and remote memory and input/output devices. An example of memory is a storage medium access device with a data storage medium that it can access.

A "data processing system" is a system that processes data. A "data processor" or "processor" is any component or system that can process data, and may include one or more central processing units or other processing components. A processor performs an operation or a function "automatically" when it performs the operation or function independent of concurrent human control.

Any two components are "connected" when there is a combination of circuitry that can transfer data from one of the components to the other.

A processor "accesses" data in memory by any operation that retrieves or modifies the data, such as by reading or writing a location in memory that includes the data. A processor can be "connected for accessing" data by any combination of connections with local or remote memory or input/output devices that permits the processor to access the data.

A processor "uses" data in performing an operation when the result of the operation depends on the value of the data.

An "instruction" is an item of data that a processor can use to determine its own operation. A processor "executes" a set of instructions when it uses the instructions to determine its operations.

An item of data "indicates" an attribute when the item has a value that depends on the existence of the attribute or on a measure of the attribute. For example, an item of data may indicate a set of instructions a processor can execute.

An item of data "includes" information indicating an attribute if data indicating the attribute can be obtained by operating on the item of data.

An "array of data" or "data array" or "array" is a combination of items of data that can be mapped into an array. A "two-dimensional array" is a data array whose items of data can be mapped into an array having two dimensions.

An item of data "defines" an array when it includes information sufficient to obtain or produce the array. For example, an item of data defining an array may include the defined array itself, a compressed or encoded form of the defined array, a pointer to the defined array, a pointer to a part of another array from which the defined array can be obtained, or pointers to a set of smaller arrays from which the defined array can be obtained.

To "obtain" or "produce" an item of data is to perform any combination of operations that begins without the item of data and that results in the item of data. An item of data can be "obtained" or "produced" by any operations that result in the item of data. An item of data can be "obtained from" or "produced from" other items of data by operations that obtain or produce the item of data using the other items of data.

An "image" is a pattern of light. An "image set" is a set of one or more images.

An image may be divided into "segments," each of which is itself an image. A segment of an image may be of any size up to and including the whole image.

An item of data "defines" an image when the item of data includes sufficient information to produce the image. For example, a two-dimensional array can define all or any part of an image, with each item of data in the array providing a value indicating the color of a respective location of the image.

An item of data "defines" an image set when the item of data includes sufficient information to produce all the images in the set.

A "data transmission" is an act that transmits data from one location to another. A "facsimile transmission" is a data transmission in which the transmitted data define an image set according to a standard format. An "image destination" is a machine or other destination to which data defining an image can be transmitted. A "fax machine" is a machine with circuitry that can receive and provide facsimile transmissions. Therefore, the telephone number of a fax machine is an example of information that indicates an image destination.

A processor performs an operation "in relation to" an item when the manner in which the operation is performed is specific to the item. For example, if the operation is facsimile transmission, the item could be a recipient to which the facsimile transmission can be made or the item could be data defining an image set that can be transmitted.

A "marking medium" is a physical medium on which a human can produce a pattern of marks by performing marking actions or actions that modify marks, such as erasing, wiping, or scratching actions. Common examples of marking media include sheets of paper and plastic, although humans can produce patterns of marks on an enormous variety of media. As used herein, "marking medium" covers one or more distinct units of a medium on which, together, a human has produced a pattern of related marks. For example, a set of paper pages that form a handwritten letter would be a single marking medium. Also, as used herein, "marking medium" includes a marking surface of an electronic device that can sense marks.

A user "marks" a marking medium or "makes a mark on" a marking medium by performing any action that produces or modifies marks on the marking medium; a user may mark a marking medium, for example, with marking, erasing, wiping, or scratching actions.

The term "mark" includes a single mark and also plural marks that together form a pattern of marks.

The terms "form" and "field" are related: A marking medium may be an instance of a "form," in which case the marking medium has a set of "fields," each of which can be marked in an appropriate way to indicate information. A field may also include information indicating how it should be marked or indicating how a mark in the field is interpreted. For example, a field may include a "check box" indicating a region within which a check-like mark should be made. A field may include one or more fields within it. In addition to its fields, a form can include additional information such as machine-readable or human-readable information identifying the form.

A mark in a field "indicates" an attribute when the presence or shape of the mark depends on the existence of the attribute or on a measure of the attribute. A field is "for indicating" an attribute when one or more appropriate marks in the field would indicate the attribute. A field "indicates" an attribute when one or more marks in the field indicate the attribute.

One type of attribute that can be indicated by a mark in a field is a "request" for an operation, in which case presence of the mark indicates an action by a user intended to cause performance of the operation. For example, the field could include a check box for the mark and could also include information identifying the operation. An operation is performed "in response" to a field when the field is for indicating a request for the operation and a mark in the field indicating a request causes the operation to be performed.

Presence of a mark in a field could also indicate an action by a user intended to indicate an operation without indicating a request for the operation. For example, a mark could indicate an operation of signalling a digit of a telephone number, where signalling the digit is one of a sequence of operations that together perform the operation of obtaining a connection to a fax machine. The mark could be an instance of the digit itself or could be a mark in a check box that indicates the digit. A field "indicates a telephone number" when the marks in the field are sufficient to identify the operations that constitute signalling the telephone number.

An image "shows" a page, such as a page of a form or a sheet, when the image is an image of the page. An image set "shows" a page when the image set includes one or more images that, separately or in combination, show the page. Data "define" a page when the data define an image set that shows the page.

Data define an image that shows a "field that has been marked" or a "field that is marked" or a "field being marked" when the data define an image of the field that includes features that would be interpreted as one or more marks in the field if the defined image were interpreted according to a definition of a form that includes the field. Data define an image set that shows a "form that has been marked" or a "form that is marked" when the data define an image of the form that shows at least one field that has been marked. Therefore, data defining an image set that shows a form that has been marked can be produced in a number of ways: For example, a form on a marking medium can be marked by hand or by typing and then the form can be scanned or facsimile transmitted; or editing software can respond to user actions such as mouse and keyboard clicks by modifying data defining an image of the form so that it includes features that would be interpreted as marks.

An image "shows the contents of" a field that has been marked when the image shows the set of features that would be perceptible as marks in the field if the image were presented to a user.

An image is "from" a form when the image shows a part of the form or the form as a whole. For example, an image showing the contents of a field of a form is "from" the form.

A "version" of a first image is a second image produced using data defining the first image. The second image may be identical to the first image, or it may be modified by loss of resolution, by changing the data defining the first image, or by other processes that result in a modified version.

An operation "creates" a page, such as a page of a form or a sheet, when the operation produces data defining the page. An operation "transmits" a page when the operation transmits data defining the page.

A "blank sheet" is a marking medium that has no marks or other information. A "sheet with simple marks" is a marking medium that has no marks or other information except a small number of marks; for example, a sheet with simple marks could have a check mark or an "X" marked on it.

B. General Features

Figure 2:
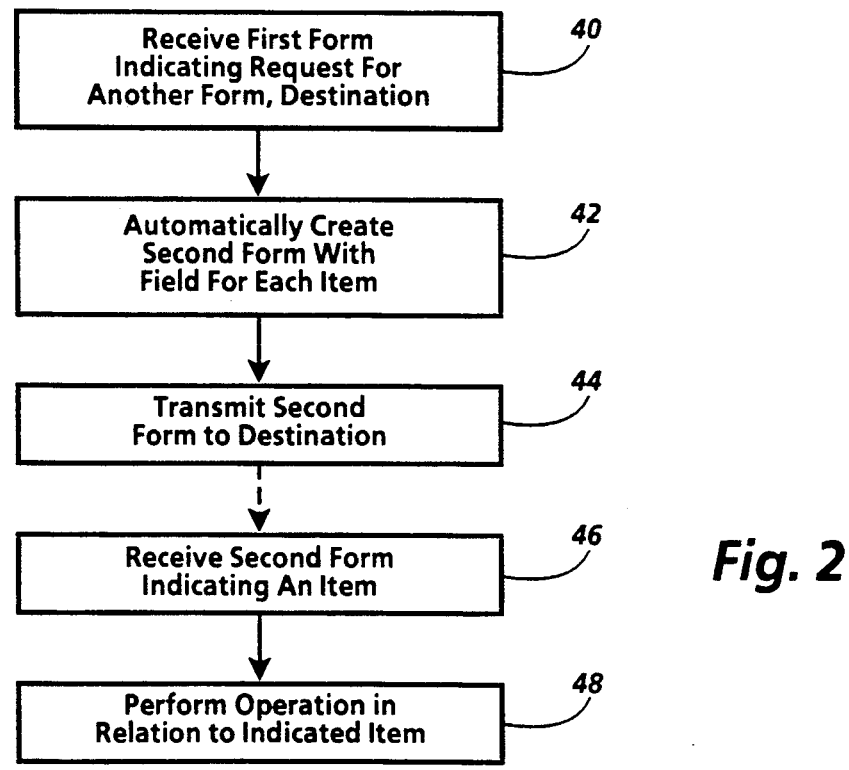
FIG. 2 is a flow chart showing general acts in automatically creating a form as in FIG. 1.
Figure 3:
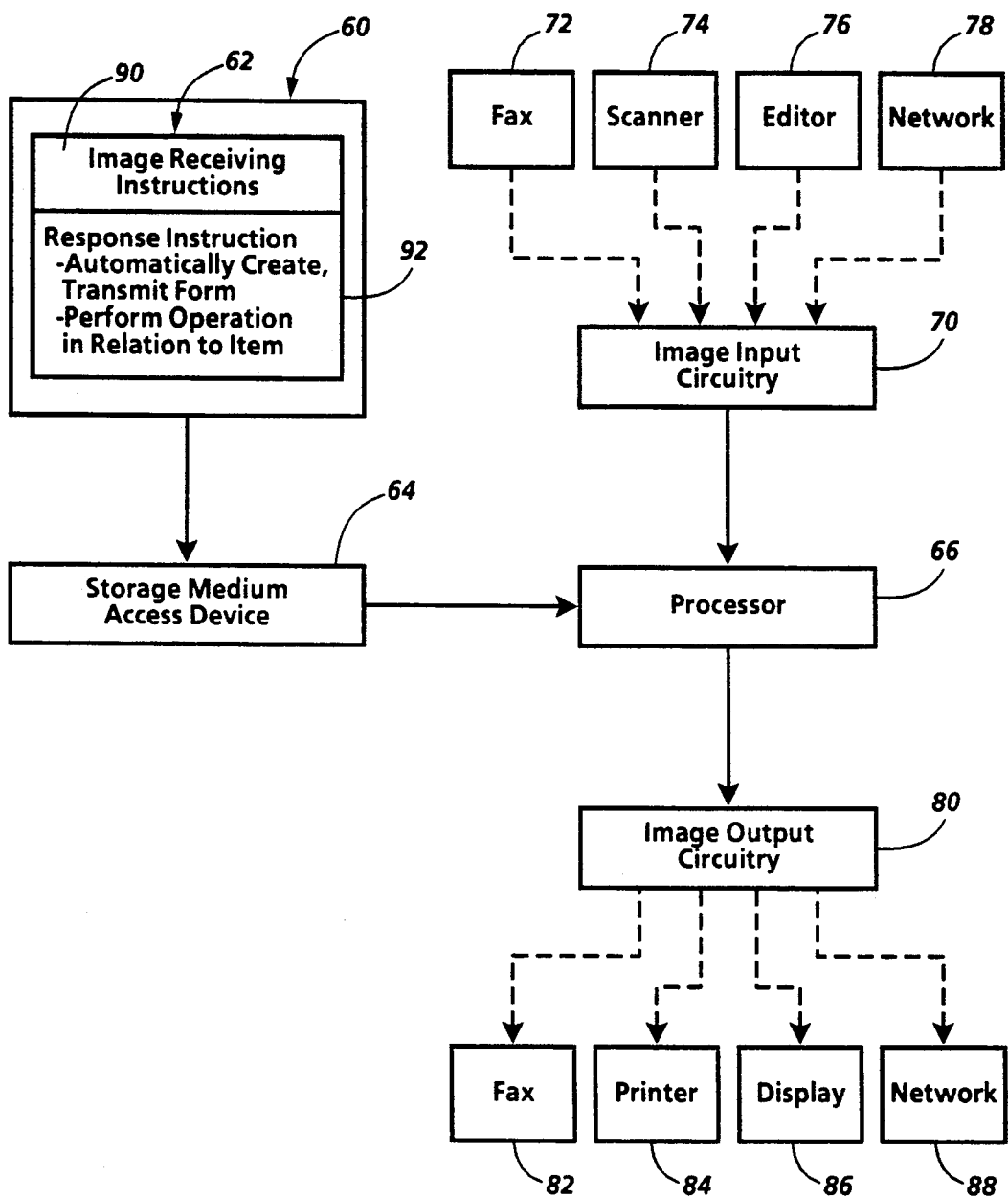
FIG. 3 is a schematic block diagram showing a software product that can be accessed by a system to automatically create a form as in FIG. 2.
Figure 4:
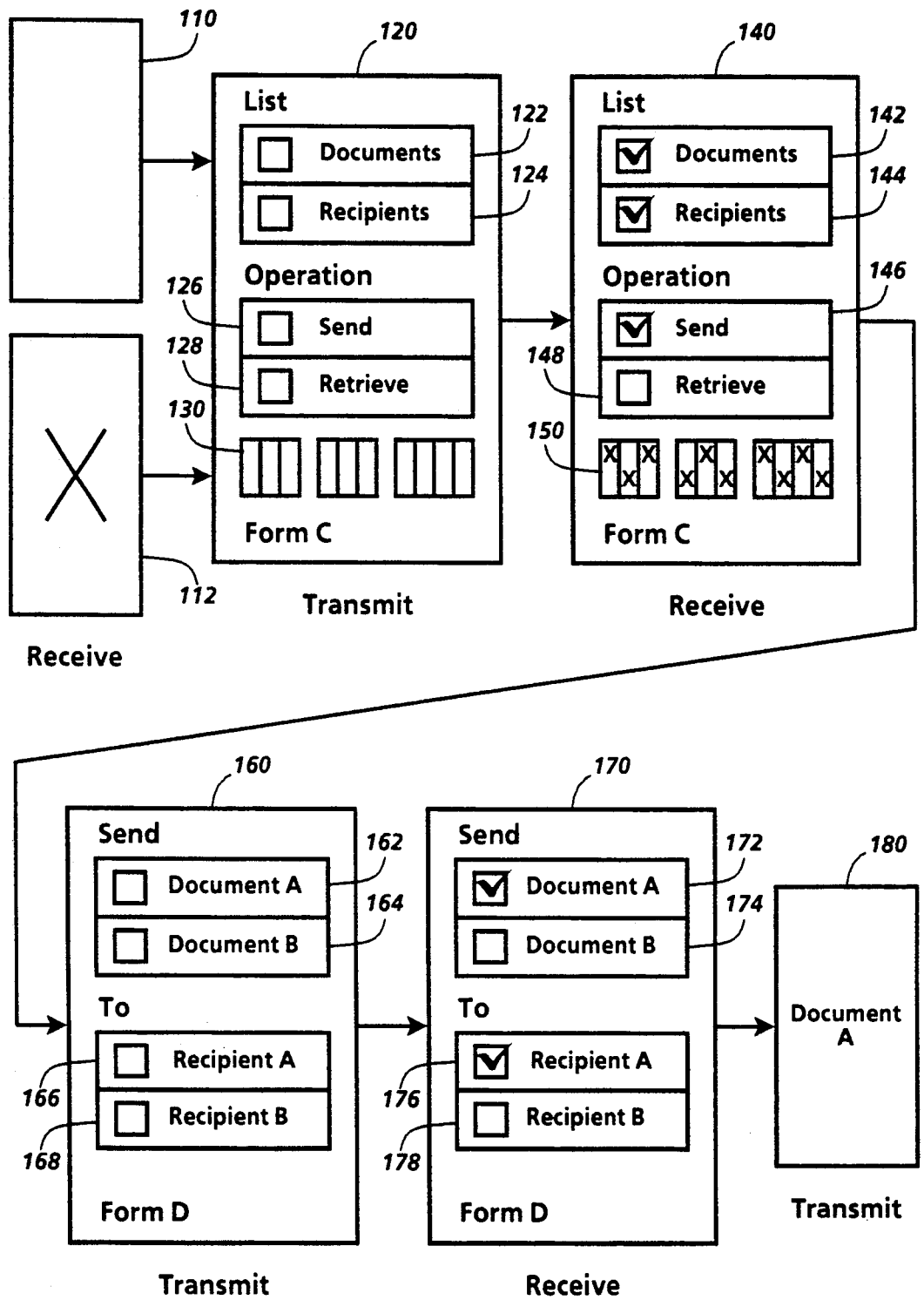
FIG. 4 is a schematic flow diagram showing a sequence of facsimile transmissions including automatic creation of a form as in FIG. 2.

FIGS. 1–4 illustrate general features of the invention. FIG. 1 is a schematic flow diagram showing how a form can be used to request automatic creation of another form. FIG. 2 is a flow chart showing general acts in automatically creating a form as in FIG. 1. FIG. 3 is a schematic block diagram showing a software product that can be accessed by a system to automatically create forms as in FIG. 2. FIG. 4 is a schematic flow diagram showing how a user can use a blank sheet or a sheet with simple marks to obtain an automatically created form.

Form 10 in FIG. 1 includes two fields. Field 12 includes check box 14 for indicating a request for automatic creation of another form. As shown, a user has marked check box 14 to request the other form. Field 16 is for indicating an image destination for the automatically created form. As shown, the user has marked check boxes in field 16 to indicate a telephone number of a fax machine or other destination to which the form can be transmitted.

Form 20, automatically created in response to form 10, includes two fields. Field 22 includes check box 24 for indicating a request for an operation in relation to item A. Field 26 includes check box 28 for indicating a request for an operation in relation to item B. A processor that automatically creates form 20 can do so based on item data indicating items A and B as items in relation to which the processor can perform an operation. In creating form 20, the processor sets up a field for each item as shown. Then, the processor transmits data defining form 20 to the destination indicated in field 16.

The act in box 40 in FIG. 2 receives data defining an image showing a first form. The first form is marked to request creation of another form and to indicate an image destination to which the form can be transmitted, like form 10 in FIG. 1. The act in box 42 uses the data defining the first form to produce data defining a second form that includes a respective field for each of a number of items in relation to which an operation can be performed, like form 20 in FIG. 1. The act in box 44 then transmits the data defining the second form to the indicated destination.

As indicated by the dashed line leading to the act in box 46, the user may then optionally mark the second form to indicate one of the items. If so, the act in box 48 responds by performing the operation in relation to the indicated item.

FIG. 3 shows software product 60, an article of manufacture that can be used in a system that includes components like those shown in FIG. 3. Software product 60 includes data storage medium 62 that can be accessed by storage medium access device 64. Data storage medium 62 could, for example, be a magnetic medium such as a set of one or more floppy disks, an optical medium such as a set of one or more CD-ROMs, or any other appropriate medium for storing data.

Data storage medium 62 stores data that storage medium access device 64 can provide to processor 66. Processor 66 is connected for receiving data defining images from image input circuitry 70. The data could be obtained from facsimile (fax) machine 72; from scanner 74; from editor 76, which could be a forms editor or other interactive image editor controlled by user input devices such as a keyboard and mouse or a pen- or stylus-based input device; or from network 78, which could be a local area network or other network capable of transmitting data defining an image. Many products are now available for making facsimile transmissions from standard text and graphics editors.

Processor 66 is also connected for providing data defining images to image output circuitry 80. The data could in turn be provided to fax machine 82, to printer 84, to display 86, or to network 88.

In addition to data storage medium 62, software product 60 includes data stored by storage medium 62. The stored data include data indicating image receiving instructions 90, which can be executed to perform the acts in boxes 40 and 46 in FIG. 2. The stored data also include data indicating response instructions, which can be executed both to create and transmit a form as in boxes 42 and 44 in FIG. 2 and also to perform an operation in relation to an indicated item, as in box 48.

Sheet 110 in FIG. 4 is a blank sheet and sheet 112 is a sheet with simple marks, illustratively an "X." An image like sheet 110 or sheet 112, when received by a fax server or similar machine, can indicate that a user is requesting an initial form for requesting automatic creation of other forms. In certain formats, facsimile transmission of an image includes data indicating the telephone number of the transmitting fax machine. Therefore, the receiving machine can respond to an image like sheet 110 or sheet 112 by automatically producing and transmitting data defining image 120 of form C to the fax machine at the telephone number from which sheet 110 or sheet 112 was transmitted.

As shown in image 120, form C is a List form for requesting automatic creation of a form. Form C includes a list segment with fields 122 and 124 for indicating requests that automatically created forms include a respective field for each stored document or for each stored recipient. Form C also includes an operation segment for requesting automatically created forms that can be used to request a send operation or a retrieve operation, respectively. Form C also includes field 130 for indicating a destination to which automatically created forms should be transmitted.

After transmitting image 120, the machine may receive image 140 of a marked version of form C. Fields 142, 144, 146, 148, and 150 in image 140 correspond to fields 122, 124, 126, 128, and 130 in image 120. Field 142 is marked to indicate a request for automatically created forms that include a field for each stored document and field 144 is marked to indicate a request for automatically created forms that include a field for each stored recipient. Field 146 is marked to indicate a request for an automatically created form that can be used to request a send operation. Field 150 is marked to indicate the telephone number of the fax machine to which the form should be transmitted.

Upon receiving image 140, the receiving machine automatically creates form D, as shown in image 160. Form D includes a document segment with fields 162 and 164 for indicating requests to send documents A and B, respectively. Form D also includes a recipient segment with fields 166 and 168 for indicating requests that a document be sent to recipients A and B, respectively. Image 160 is transmitted to the fax machine at the telephone number indicated in field 150.

After transmitting image 160, the machine may receive image 170 of a marked version of form D. Fields 172, 174, 176, and 178 in image 170 correspond to fields 162, 164, 166, and 168 in image 160. Field 172 is marked to indicate a request to send document A and field 176 is marked to indicate a request that a facsimile transmission be made to recipient A.

Upon receiving image 170, the receiving machine automatically transmits document A to recipient A, as shown by image 180.

C. Implementation

The general features described above could be implemented in numerous ways on various machines. A current implementation runs on an IBM PC compatible machine (a "PC") with at least an 80386 microprocessor. The PC is equipped with a "fax card," meaning a combination of a board and software that enables the PC to transmit and receive facsimile images in a standard format, such as CCITT Group 3. The fax card could, for example, be SatisFAXtion TM from Intel Corporation; The Complete Communicator TM or The Complete Fax TM from The Complete PC, Inc; or proFAX TM from Charter Electronics Industries Pte. Ltd. Because the current implementation is closely linked to a fax card, it is referred to herein as a "fax server."

1. General Fax Server Software Features

Figure 5:
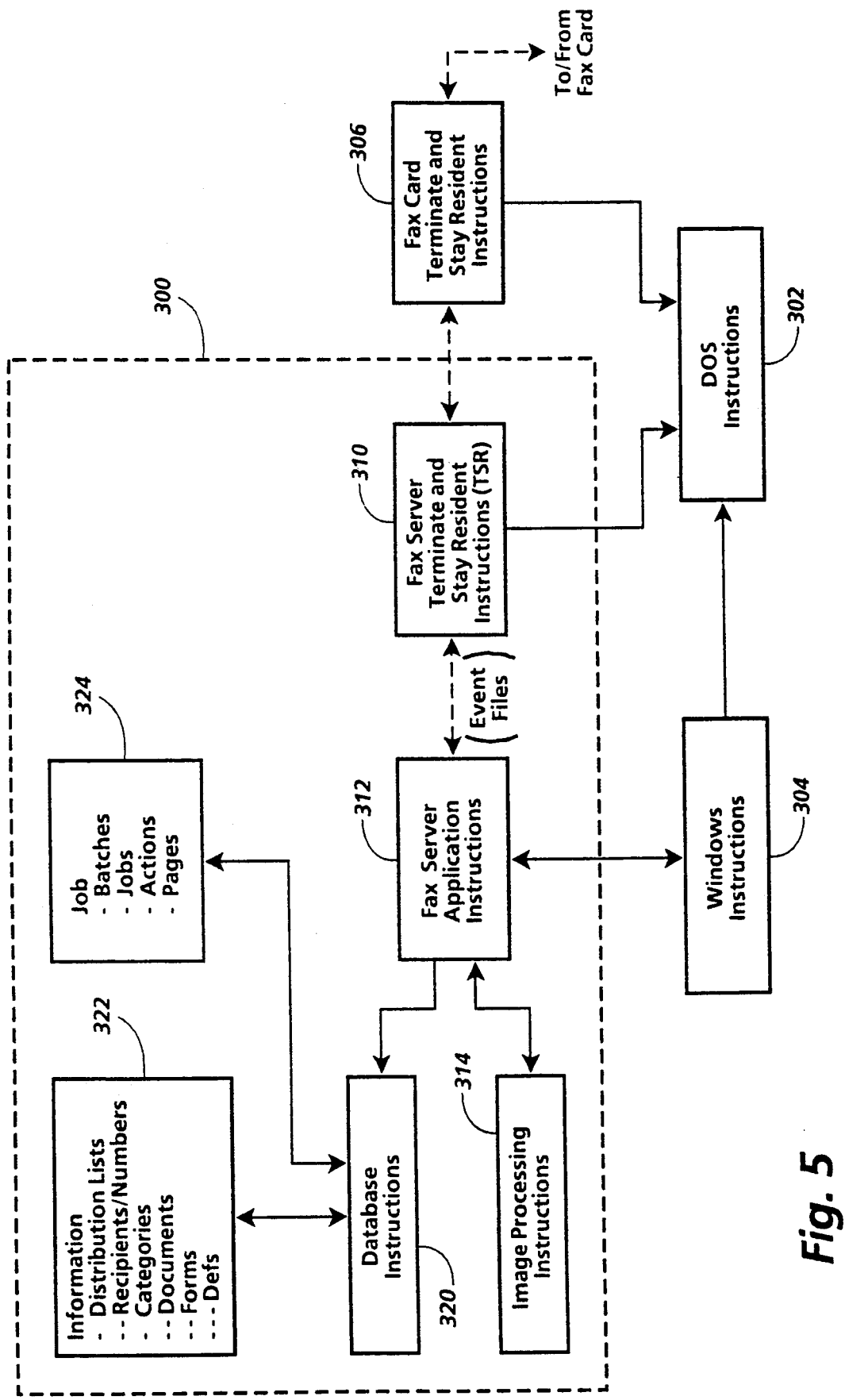
FIG. 5 is a schematic block diagram showing software components of a system that can respond to a form requesting automatic creation of a form.
Figure 6:
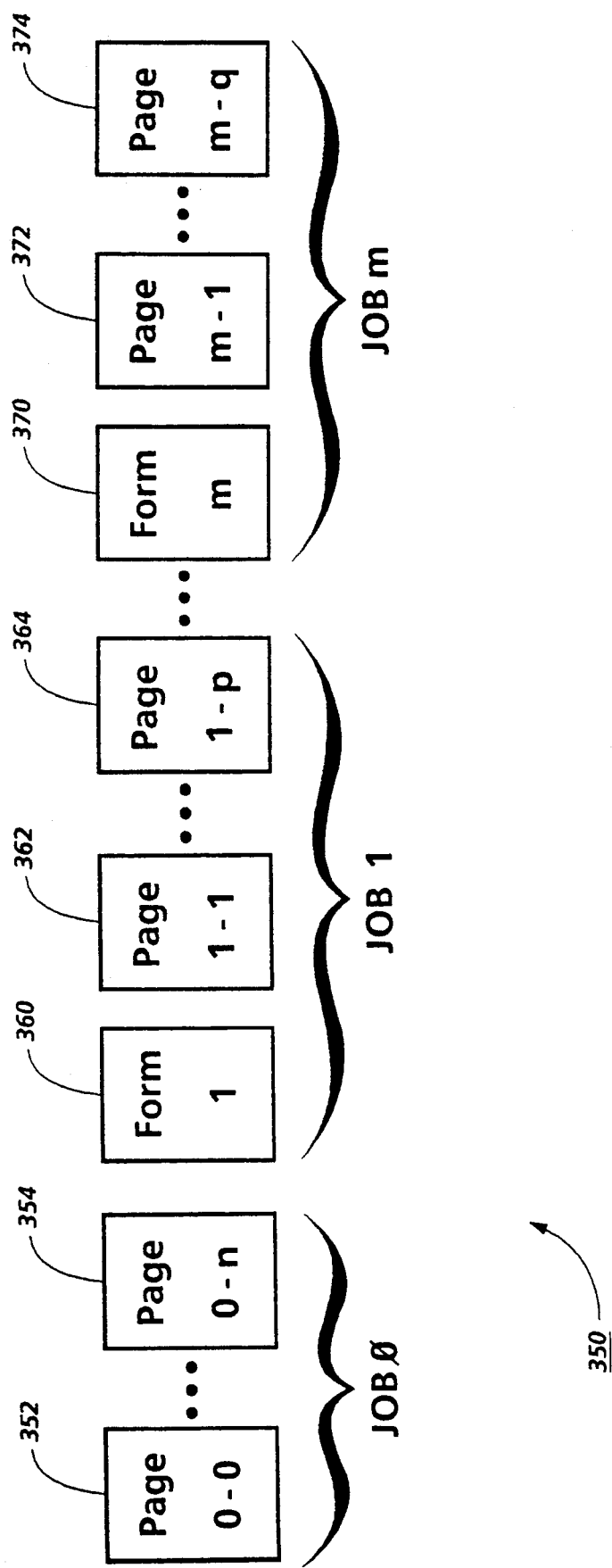
FIG. 6 is a schematic diagram showing a batch that can be handled by the components in FIG. 5.

FIG. 5 shows general software components of the current implementation. FIG. 6 illustrates the organization of a batch that is set up in response to a request from a user.

FIG. 5 shows general software components and some of the communication paths between components. Fax server software 300 includes instructions executed by a processor that is executing DOS instructions 302. In the current implementation, the processor is also executing at least the 3.0 version of Microsoft ® Windows TM, shown as windows instructions 304.

The communication path between fax server software 300 and the fax card goes through two DOS resident components, fax card terminate and stay resident instructions 306 and fax server terminate and stay resident instructions (TSR) 310.

For most fax cards, fax card terminate and stay resident instructions 306 can be installed when the fax card is installed. For each of these fax cards, fax server software 300 includes a respective TSR 310 that can be loaded when the user installs fax server software 300 in response to a signal from the user indicating the type of fax card.

Some fax cards, such as proFax, have a separate driver for programming. In these cases, the fax card is installed and TSR 310 is loaded during installation of fax server software 300.

Fax card terminate and stay resident instructions 306 and TSR 310 communicate to receive and send facsimile transmissions.

When a facsimile transmission is received, the fax card automatically stores the received data in a directory in the DOS filing system. When TSR 310 next polls fax card terminate and stay resident instructions 306, TSR 310 receives data indicating that a received transmission is in a file in the directory. In response, TSR 310 assigns an event number to the file and creates an event file. The event file includes the event number and other information, such as the DOS file name of the received file and the telephone number of the sending fax machine (or an empty identifier if a telephone number is not available).

When fax server application instructions 312 next poll TSR 310, TSR responds with the event number of the next unprocessed event file. Fax server application instructions 312 can then handle the received transmission as described below.

Similarly, before fax server application instructions 312 signal TSR 310 to send a facsimile transmission, they create an event file with the next available event number. This event file can include the event number, the telephone number of the destination, a temporary file number identifying a temporary file containing data to be transmitted, and such other information as a user name for a header on transmitted pages, and so forth.

In response to the event file, TSR 310 provides data to fax card terminate and stay resident instructions 306 indicating the destination. TSR 310 can temporarily save the items to be sent in a directory in the DOS filing system. Then fax card terminate and stay resident instructions 306 can put a request on a queue of requests to the fax card. Subsequently, in response to status checks from fax server application instructions 312, TSR 310 can request data from fax card terminate and stay resident instructions 306 indicating whether the items have been successfully sent.

Fax server application instructions 312 perform the central functions of fax server software 300. In addition to the above, fax server application instructions 312 also call image processing instructions 314 to perform image processing operations and database instructions 320 to manage data in information database 322 and job database 324. A user can interact with fax server application instructions 312 through windows instructions 304.

In the current implementation, database instructions 320 include the instructions of db_Vista TM, a commercial database product from Raima Corporation. Information database 322 and job database 324 are both implemented using db_Vista.

Information database 322 includes two lists, a list of distribution lists and a list of categories of documents and forms. Each list appears as a top level container within the user interface provided by windows instructions 304, and the user can set up new distribution lists and categories through the user interface. Each distribution list includes information about a set of recipients, including data identifying recipients and telephone numbers of their fax machines; one distribution list, named "All Recipients," includes all of the recipients. Each category of documents and forms includes a set of items, each of which is either a document or a form. For each document, the category includes a pointer to the name of the DOS file in which data defining the document is stored. For each form, the category includes a pointer to the name of the DOS file in which the definition or description of the form is stored.

Job database 324, on the other hand, acts as an automatic scheduler for processing a series of images. Job database 324 therefore includes data indicating any pending batches, jobs, actions, and pages, as described more fully below.

As can be understood from FIG. 5, fax server application instructions 312 can receive requests from a user through the user interface provided by windows instructions 304, based on a display and a user input device such as a keyboard and mouse. In the current implementation, these requests are received as a data structure indicating contents of a form. Fax server application instructions 312 can also receive user requests on forms in facsimile transmissions received by the fax card. Fax server application instructions 312 can respond to a request from either user interface by setting up a batch in job database 324.

FIG. 6 shows batch 350, which includes a series of m jobs, each of which includes data defining one or more images. The images are illustratively pages, such as pages of a facsimile transmission. Job 0 includes n pages, with pages 352 and 354 being the first and last respectively. Job 1 includes p pages, with the first, page 360, defining a form and with pages 362 and 364 being the second and last respectively. Similarly, the following jobs each begin with a form, as illustrated by the last job, with q pages beginning with page 370 defining a form and with pages 372 and 374 being the second and last respectively.

FIG. 6 illustrates several general features in the operation of job database 324 in the current implementation: A batch includes one or more jobs. Each job includes one or more pages. The first job in a batch may not begin with a form, but every job after the first begins with a form which may be followed by a set of pages. Each job thus includes one of the following: a single blank sheet; a number of non-form pages, also referred to as a document; a single form; or a single form followed by a document.

The basic scheduling operation is a cycling operation that, on each cycle, selects an action to be performed from those currently existing in job database 324. The current implementation has a number of different types of actions, many of which may be used to handle a received facsimile transmission. An action of a given type may be "created," meaning that an instance of the type is set up in job database 324.

An action in job database 324 includes various items of information including data indicating the action's function and data that can be used in scheduling performance or execution of the action's function. The scheduling data includes the action's state, whether ready or done; the earliest time to start performing the action's function; a priority to ensure that a retrieve function will be completed before a send function; and, optionally, a special function called a readyproc to determine whether the action is ready for performance of its function.

The Input action is a default action whose function is performed when no other action is ready, based on a readyproc that checks whether other actions are ready. Therefore, job database 324 always includes an Input action. The Input action's function polls TSR 310 to obtain data indicating whether or not a facsimile transmission has been received. If so, the function obtains an event file for the newly received images, sets up a new batch in job database 324, and creates a Batch action.

The Batch action is created by an Input action, as described above. The Batch action's function calls a converter procedure that is appropriate for the fax card being used, as indicated by the user at the time fax server software 300 is installed; the converter procedures convert a received file from the fax card's format to a DOS file in fax server format; the DOS file name can be based on an integer identifier to facilitate communication between windows instructions 304 and TSR 310. Conversion can be performed by calls to modules that can be independently modified and extended. Conversion techniques are described in copending coassigned U.S. patent application Ser. No. 07/856,000, entitled "A System and Method for Storing Received Facsimile Image Data in Computer Memory," incorporated herein by reference.

The Batch action's function also creates, for each page in the received file, a page entry and a Page action to be performed on that page in job database 324; if only a single page is received, the function includes data in the page entry indicating a single page batch; the function also creates a Job Set action. The function also creates a Cleanup action.

The Page action is created by a Batch action, as described above. Each Page action has a respective page entry for storing data relating to the respective page.

If the page is a single page batch, the Page action's function calls image processing instructions 314 to determine whether the page is blank. Techniques for detecting a blank page are described in copending coassigned U.S. patent application Ser. No. 07/855,375, entitled "Identification of a Blank Page in an Image Processing System," incorporated herein by reference. If the page is not blank or if the batch has more than one page, the function calls image processing instructions 314 to determine whether the page is a form or a data (non-form) page. Data indicating whether the page is a form or a data page is stored in the page entry; if the page is a form, data identifying the form is also obtained from the image and stored in the page entry.

If every form includes a distinctive registration mark such as a logo, image processing instructions 314 could first search for the logo and determine whether the page is a form using the result of the search. Then, if each form includes machine readable identifying information, the image processing instructions 314 could operate on data defining the image of the form to obtain identifying data identifying the form. Form identifying information could be encoded and included in the image in the manner described in copending coassigned U.S. patent application Ser. No. 07/560,514, continued as Ser. No. 07/931,584 entitled "Self-clocking Glyph Shape Codes," incorporated herein by reference.

The Job Set action is also created by the Batch action, as described above. The Job Set action has a readyproc that determines that it is ready when there are no pages in the batch whose type remains unknown, meaning that all Page actions for the batch have been completed. In accordance with FIG. 5, a job is created in job database 324 for each job in the batch. Each job is also added to an activity log that lists all jobs, transactions, and transmissions. If a job includes only a single blank sheet, the Job Set action converts an initial form called the "Starter Form," to the fax card format and creates a Retrieve action to transmit the converted Starter Form, as discussed in greater detail below. If a job begins with a form, a Form action is created for the job.

The Form action is created by the Job Set action, as described above. The Form action uses the data identifying the form from the page entry, as stored by the Page action, to access the form's definition from information database 322. The Form action then uses the form's definition to construct calls to image processing instructions 314.

A call to image processing instructions 314 can include data indicating a segment of the form's image, such as a rectangle, or a position within the form's image, such as a corner of a check box. Each call can also include data indicating an operation to be performed; examples include an operation that determines whether a segment has been marked and an operation that clips a segment that has been marked and returns its contents in the form of an array such as a bitmap.

The Form action uses the form's definition and the results returned by image processing instructions 314 to create actions and other items within job database 324. For example, the form definition can indicate that, if a given check box is marked, a Store action should be created to store a document in response to a Store form; or that a Delete action should be created to delete a document in response to a Delete form; or that a Pre-Send action should be created to prepare to provide a facsimile transmission in response to a Send form; or that a Pre-Retrieve action should be created to prepare to provide a facsimile transmission to a destination indicated on the form or back to the fax machine that sent the form, typically in response to a Retrieve or List Contents form; and so forth.

When the Form action must obtain a destination for a Retrieve action, it begins by using a destination indicated on the form, such as a telephone number of a fax machine. If none is indicated, the Form action uses the telephone number in the current event file, indicating the fax machine from which the Retrieve action was requested. If none, the Form action leaves the destination blank.

As discussed in greater detail below for certain cases, the form's definition can indicate that a new form, a cover sheet, or another image should be automatically created, in which case the Form action obtains data defining the new form, cover sheet, or other image. If a new form is created, it is added to a special category called "All Forms."

The Store action can be created by the Form action, as described above, in response to a Store form that precedes a set of one or more data pages. The Store action obtains a system identifier, such as a file location of the data pages, stores the system identifier in any categories indicated in check boxes on the form and, even if no categories are indicated, stores the system identifier in a special category called "All Documents." The Store action can also associate data defining an identifying image from the Store form with the system identifier in the manner described in copending coassigned U.S. patent application Ser. No. 07/855,987, entitled "Method and System for Labeling a Document for Storage, Manipulation, and Retrieval," incorporated herein by reference.

The Delete action can be created by the Form action, as described above, in response to a Delete form that includes check boxes indicating a set of one or more documents. The Delete action deletes entries in information database 322 for the indicated documents and also deletes the files in which the pages of the documents are stored.

The Pre-Send action can be created by the Form action, as described above, in response to a Send form that includes check boxes indicating a request to provide a facsimile transmission to a set of one or more indicated recipients. The Pre-Send action converts the items to be transmitted, such as forms, cover sheets, and documents, from the fax server's format to the appropriate format for the fax card being used, and stores each converted item in a respective DOS file. Conversion techniques are described in copending coassigned U.S. patent application Ser. No. 07/856,000, entitled "A System and Method for Storing Received Facsimile Image Data in Computer Memory," incorporated herein by reference. For each indicated recipient, the Pre-Send action obtains data indicating a transmission path, such as a fax machine's telephone number.

If the recipient is a new recipient, the Send form includes check boxes indicating the recipient's transmission path. If the Send form also includes a check box requesting that the recipient be added to the recipient index, the Pre-Send action adds data indicating the recipient's transmission path to indicated distribution lists in information database 322 and, in any event, to a special distribution list called "All Recipients." The Pre-Send action can also associate data defining an identifying image from the Send form with the recipient's transmission path in the manner described in copending coassigned U.S. patent application Ser. No. 07/855,987, entitled "Method and System for Labeling a Document for Storage, Manipulation, and Retrieval," incorporated herein by reference.

If the recipient is indicated by a check box, the Pre-Send action retrieves the recipient's transmission path data from information database 322. Similarly, if all recipients in a distribution list are indicated by a check box, the Pre-Send action retrieves each recipient's transmission path data.

In either case, the Pre-Send action creates a Send action for each recipient.

The Send action can be created by the Pre-Send action as described above. The Send action orders the DOS files containing items to be transmitted to the specified recipient into a single queue. The Send action submits a request to TSR 310 to send the DOS files in the queue to the specified recipient. The Send action concludes by creating a Verify action.

The Pre-Retrieve action can be created by the Form action, as described above, in response to any request for a facsimile transmission other than a Send form. Like the Pre-Send action, the Pre-Retrieve action converts the items to be transmitted to the appropriate format for the fax card being used, and stores each converted item in a respective DOS file. Then the Pre-Retrieve action creates a Retrieve action.

The Retrieve action can be created by the Pre-Retrieve action as described above. The Retrieve action obtains data indicating a transmission path as obtained by the Form action, either from a return address section on the form or from the data defining the received transmission. If the Form action did not obtain a destination, the Retrieve action fails. The Retrieve action orders the DOS files containing items to be transmitted to the destination into a single queue. The Retrieve action submits a request to TSR 310 to send the DOS files in the queue to the destination. Like the Send action, the Retrieve action creates a Verify action.

The Verify action can be created by the Send action or the Retrieve action, as described above. The Verify action submits a request to TSR 310 for data indicating the status of the facsimile transmission that resulted from the Send action or Retrieve action that created the Verify action. If the facsimile transmission has not yet completed, the Verify action resets its start time so that it will be performed again later. The fax card will redial according to its configuration, and if the fax card reports a failure, the Verify action reports the failure to the activity log before completing.

The Cleanup action can be created by the Batch action as described above. The Cleanup action has a readyproc that determines that it is ready to be performed only when all other actions associated with the Batch action that created it are completed. The Cleanup action deletes any temporary files created by the other actions associated with the Batch action.

Each cycle of the basic scheduling operation selects an appropriate action to be performed next. For example, if the only actions that are ready are a Batch action and its Cleanup action, the Batch action is selected and performed.

In addition to selecting an action to be performed next, each cycle of the basic scheduling operation branches based on whether a user interface action is waiting from the user interface provided by windows instructions 304. If so, a waiting user interface action is performed.

It would be straightforward to extend the current implementation to handle forms that request more than one type of operation or to handle a special form indicating a new recipient but not requesting a Send action. Similarly, it would be straightforward to extend the current implementation so that all the facsimile transmissions to a single destination from a single batch would be combined into a single continuous transmission rather than being transmitted independently.

2. Automatic Form Creation—List Items

Figure 7:
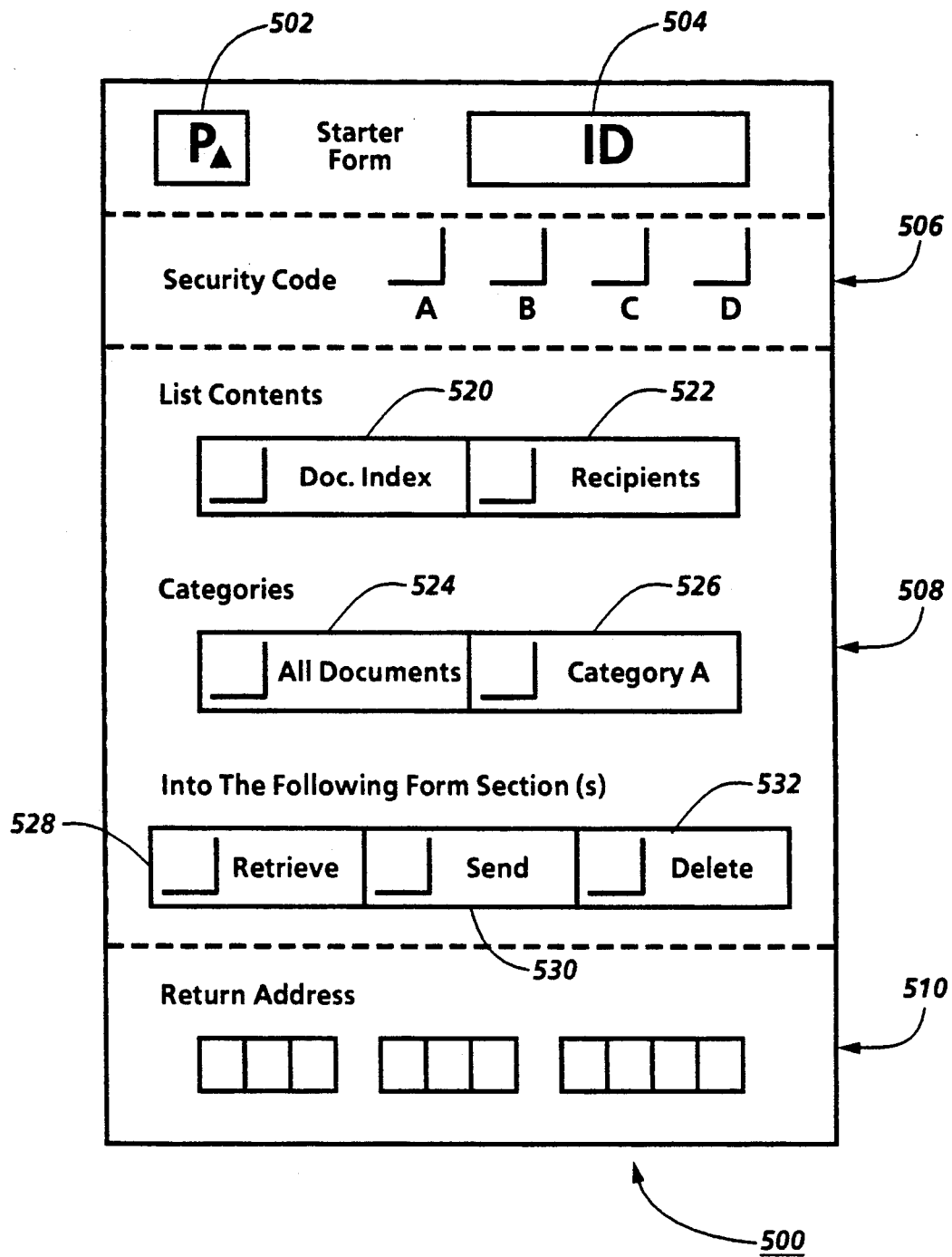
FIG. 7 is a schematic diagram showing a starter form that can request automatic creation of a form by a fax server executing software like that in FIG. 5.
Figure 8:
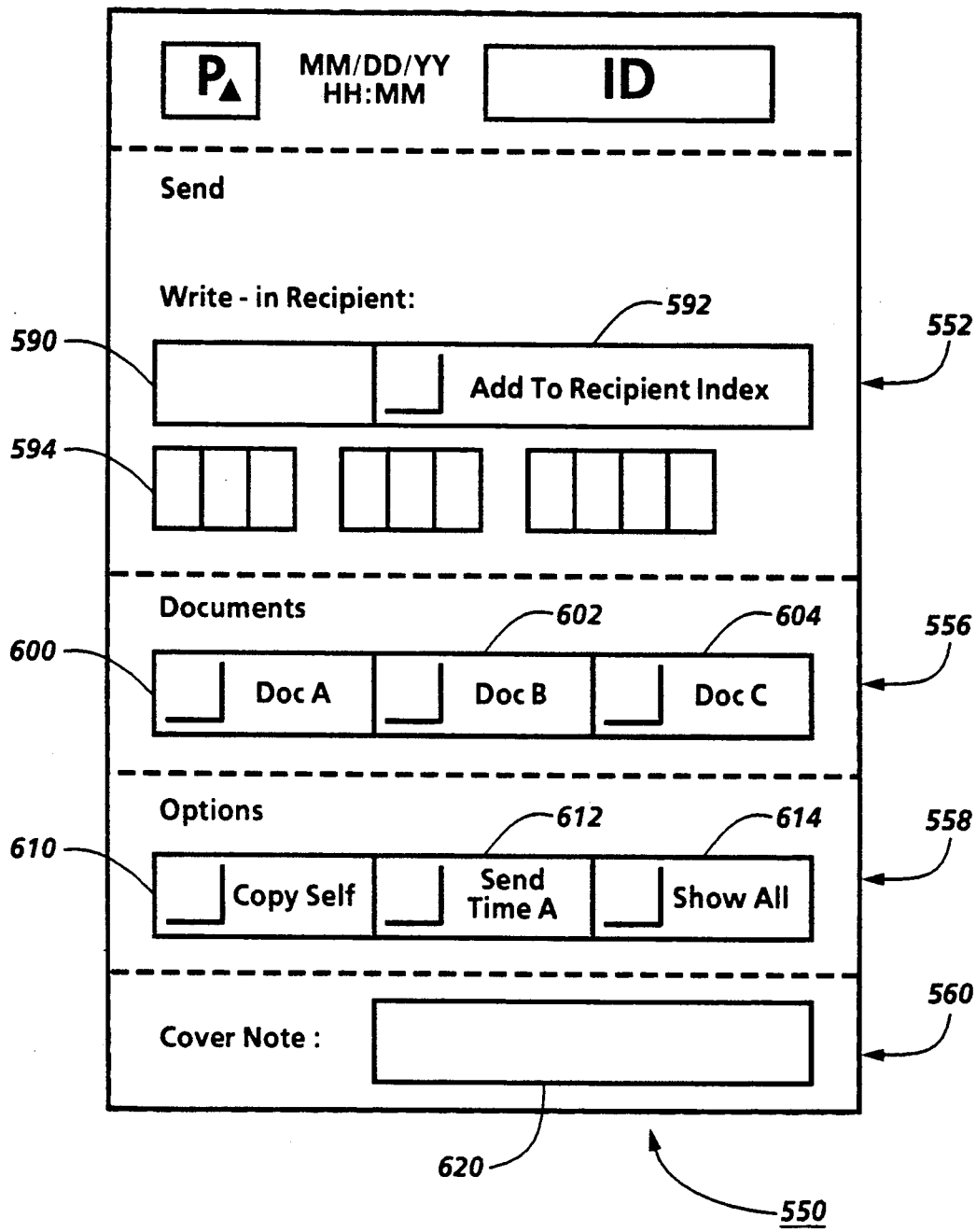
FIG. 8 is a schematic diagram showing a send form that can be automatically created in response to a version of the form in FIG. 7.
Figure 9:
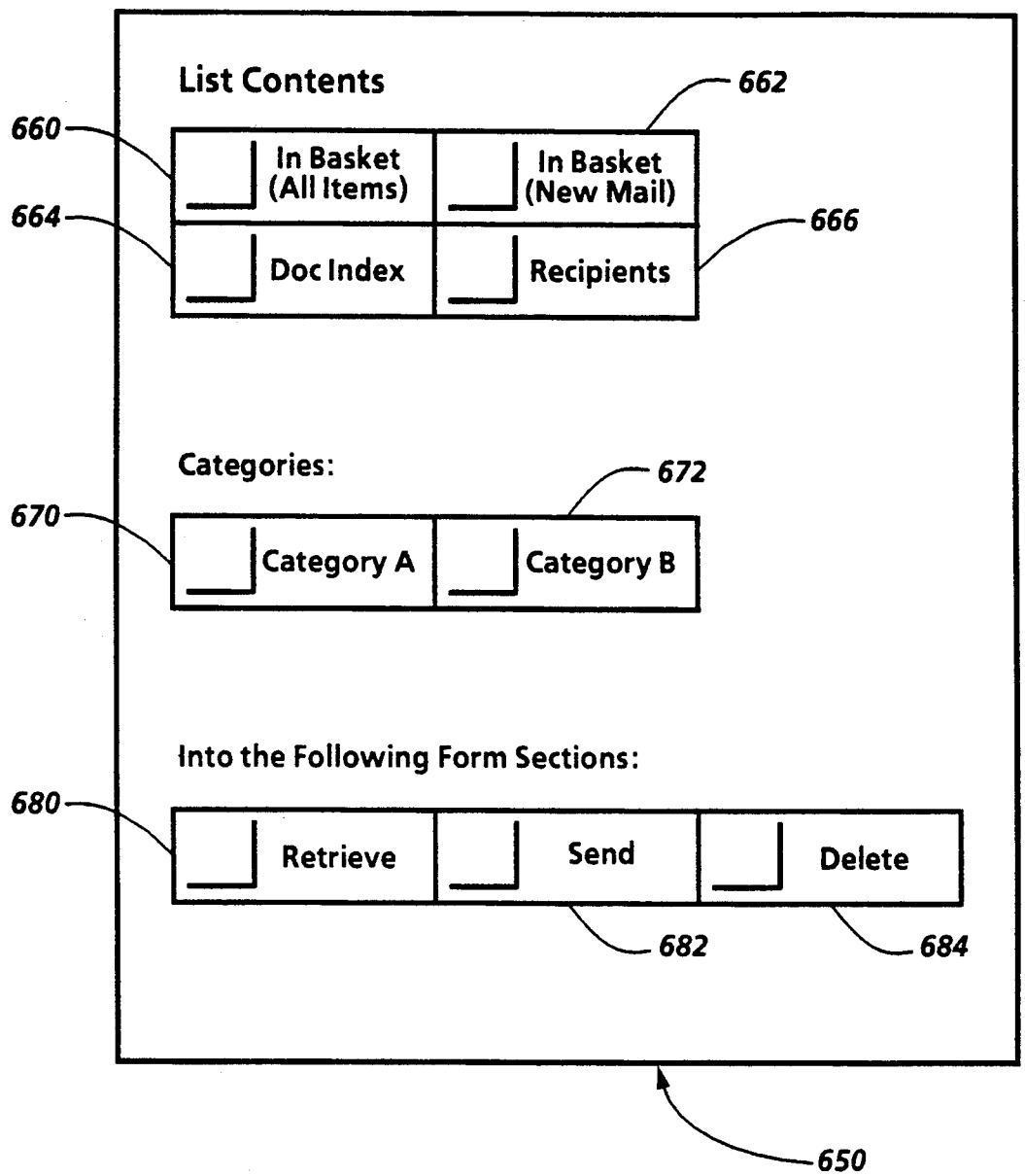
FIG. 9 is a schematic diagram showing a general list request segment that can be used to request automatic creation of forms.
Figure 10:
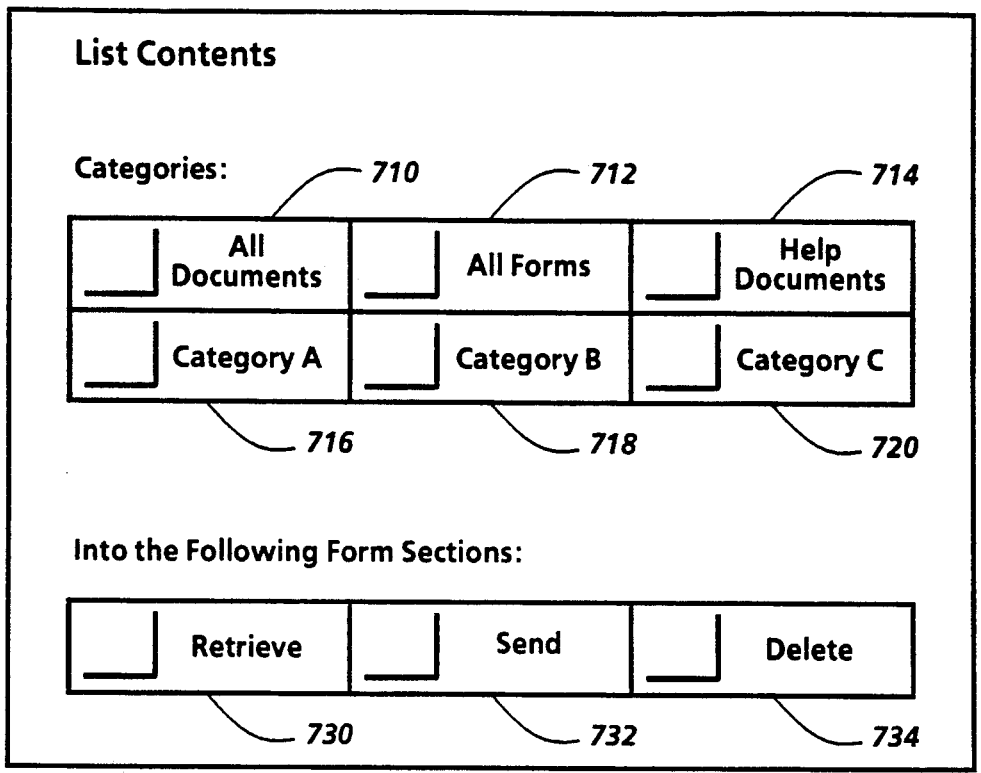
FIG. 10 is a schematic diagram showing a list request segment within a form that is automatically created in response to a version of the list request section in FIG. 9.
Figure 11:
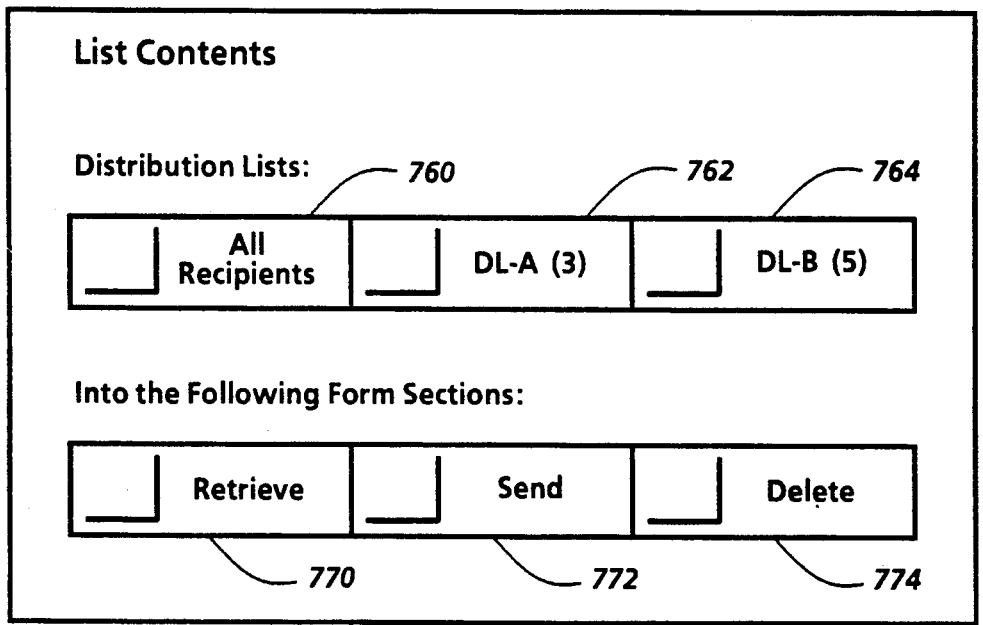
FIG. 11 is a schematic diagram showing a list request segment within another form that is automatically created in response to a version of the list request section in FIG. 9.

FIGS. 7-11 illustrate how the general fax server features described above can be used to implement the invention. FIG. 7 shows a Starter Form that can be used to request automatic creation of forms. FIG. 8 shows an automatically created Send form that could be created in response to the Starter Form of FIG. 7. FIG. 9 shows a List Contents section that can be used to request a variety of automatically created forms. FIGS. 10 and 11 show two List Contents sections that could be created in response to the List Contents section of FIG. 9.

The fax server can automatically transmit Starter Form 500 in FIG. 7 upon receiving a facsimile transmission of a blank sheet or of a sheet with simple marks. Starter Form 500 can be created in advance by a user through a form editor user interface provided by windows instructions 304. The form editor can allow the user to create a form with one or more sections, each for requesting a respective type of transaction, such as Send, Retrieve, Store, List Contents, and Delete. Documentation provided with software product 60 can explain to the user how to set up an initial form like Starter Form 500, and an example form can be provided as a starting point.

In the current implementation, the Job Set action, upon determining that a batch includes only a single blank sheet, uses data indicating the name of the Starter Form to query information database 322 to find the form definition of the Starter Form. If none is found, the Job Set action stops creating further actions, so that no facsimile transmission is made. But if a form definition is found, its DOS file name is obtained from the entry in information database 322. Then the Job Set action sets up a Pre-Retrieve action to transmit the Starter Form.

As described above, the Pre-Retrieve action converts the Starter Form, as defined by its form definition, to the appropriate format for the fax card being used, and stores the result in a DOS file. Then it creates a Retrieve action to request a facsimile transmission of the Starter Form.

The Retrieve action, as described above, obtains data indicating a transmission path. Since the received image did not include check boxes, the Retrieve action uses the received facsimile transmission to obtain data indicating the telephone number of the fax machine that sent the blank sheet or the sheet with simple marks. As described above, the Retrieve action submits a request for a facsimile transmission to TSR 310 and creates a Verify action to check for success.

Form 500, like other forms in the current implementation, includes logo 502 for use in registration and to determine that it is a form. Form 500 also includes machine readable form identifying information, illustratively in a distinct field 504. The form identifying information could be encoded in the manner described in copending coassigned U.S. patent application Ser. No. 07/931,554, entitled "Self-clocking Glyph Shape Codes," incorporated herein by reference. Each form shown has its own unique identifying information, and this information can be generated at the time the form is created, based on a function of an identifier of the software installation that creates the form. In addition to the fields shown, each form can also have human readable name, date and time of creation, and other information.

Form 500 also includes security code segment 506, illustratively shown with a number of check boxes, each for a respective character. The check boxes in this and other segments can be implemented for detection as described in copending coassigned U.S. patent application Ser. No. 07/855,984 entitled "Mark Sensing on a Form," incorporated herein by reference.

Security code segment 506 could be implemented in a wide variety of ways, but its basic purpose is to provide a field that the user can mark to provide information indicating a code. Upon receiving a marked version of form 500, the Form action can determine whether the indicated code matches a previously stored code. If not, the Form action can ignore the received form or can create and transmit an image with an appropriate message. An illustrative technique for responding to an incorrect code is described in copending coassigned U.S. patent application Ser. No. 07/855,388 entitled "Using an Image from a Form in Automatic Creation of a Form or Sheet," incorporated herein by reference.

As noted above, the user can create an initial form like form 500 through a form editor user interface. Therefore, the inclusion of security code segment 506 is optional, and may be advisable to prevent unauthorized used of a fax server. Where a fax server is shared by more than one user, a segment similar to security code segment 506 could be used by each user to provide the user's unique authentication or identification code. Also, a segment similar to security code segment 506 could be included on every form or on any form requesting an action that could destroy information or provide stored information to a remote fax machine, including Send forms, Retrieve forms, Delete forms, and List Contents forms.

Form 500 also includes list request segment 508 and return address segment 510. These segments together allow the user to request automatic creation of a form and transmission of the newly created form to an indicated destination.

List request segment 508, an example of a List Contents section, includes fields 520, 522, 524, 526, 528, 530, and 532, each with a check box and additional information indicating the effect of checking the box. The fields together are for indicating the contents of the newly created form.

The user can mark fields 520 and 522 to request that the new form include a list of the current contents of the document index and recipient index in information database 322, respectively. The document index includes an entry for each document that has been stored, while the recipient index includes an entry for each individual recipient and also an entry for each distribution list of multiple recipients. This portion of list request segment 508 can also include a field for requesting that the new form include a list of the current contents of an electronic mail inbasket maintained by windows instructions 306, either all contents or new contents since the contents were last presented to the user. This portion of list request segment 508 can also include a field for requesting that the new form include a list of the contents of the Activity Log, which can either include all completed jobs or all jobs that have not been completed.

The user can mark either of fields 524 and 526 when field 520 is marked. Field 524 can be marked to request that all documents be listed on the new form, while field 526 can be marked to request that only documents in category A be listed.

The user can mark any of fields 528, 530, and 532 to request the type of section in which the list to be created. If the box in field 528 is marked, the section is for requesting a Retrieve action; if in field 530, a Send action; and if in field 532, a Delete action.

Return address segment 510 includes a set of check boxes that can be used to indicate a fax machine's telephone number. The user can mark these check boxes to request that the newly created form be transmitted to the fax machine where the user is located or to another fax machine.

When the fax server receives a facsimile transmission of an image set that includes an image of form 500, it sets up actions as described above. The Batch action creates the Job Set action and the Job Set action creates the Form action. The Form action, as described above, begins by obtaining the definition of form 500 from database 322. The definition in this case indicates that form 500 includes security code segment 506, list request segment 508, and return address segment 510. The Form action thus determines whether the code indicated in security code segment 506 matches a stored code; if so, the Form action creates a new form as specified in list request segment 508; finally, the Form action creates a Pre-Retrieve action to transmit the new form, either to the destination indicated in return address segment 510 or to the fax machine that transmitted the completed form 500 to the fax server.

The Form action can begin by calling image processing instructions 314 to obtain data indicating the code marked by the user in security code segment 506. If the code is acceptable, the Form action then handles the other segments of form 500.

The form definition indicates that form 500 includes a List Contents section, meaning that form 500 can be used to request an automatically created form listing the contents of one or more containers. In the user interface metaphor of the current implementation, information database 322 includes a hierarchy, with the leaf nodes being items of data relating to specific recipients, documents, and forms and with the parent nodes being containers. Information database 322 includes two top level containers: One, the "recipient index," contains containers called distribution lists. The other, called the "document index," contains containers called categories.

Each distribution list and category holds leaf nodes. Each distribution list contains one or more recipient entries, each including data indicating a transmission path to a recipient. Each category contains one or more pointers; each pointer indicates either a DOS file that contains a document or a DOS file that contains a form definition.

The recipient index always contains a distribution list called "All Recipients," which contains data for every registered recipient. The document index always contains categories called "All Documents," "All Forms," and "Help Documents," which respectively contain a pointer for every stored document other than help documents, for every stored form definition, and for every stored help document. In addition, the user can request creation of additional distribution lists and categories.

Unlike a List Contents section in an automatically created form, form 500 includes both field 520 for requesting a listing of the contents of the document index and also fields 524 and 526 for requesting listings of the contents of two categories within the document index.

Form 500 can contain fields for requesting listings at more than one level of the hierarchy because it is a user created form. In the current implementation, on the other hand, a List Contents section in an automatically created form has listings at only one level of the hierarchy.

In response to a List Contents section of a form, the Form action calls image processing instructions 314 to obtain data indicating the containers to be listed and the types of forms, if any, onto which the contents should be listed. The types of forms created in response to a List Contents section in various circumstances are discussed in greater detail below.

In listing contents on any form, the current implementation of the Form action proceeds as follows: The Form action determines the containers for which a listing of contents is requested.

If the containers to be listed contain more items than can fit onto a single sheet of the form, the Form action divides the list into smaller groups, each small enough to fit on a single sheet. Then for each sheet, the Form action allocates a position to each item and defines a field at the position. The field can, for example, include a check box, an identifier of the item, and, in the case of a distribution list, a number indicating the number of recipients in the distribution list. The identifier of the item can be an image obtained in the manner described in copending coassigned U.S. patent application Ser. No. 07/855,388, entitled "Using an Image from a Form in Automatic Creation of a Form or Sheet," incorporated herein by reference.

If a list must be divided into groups each small enough to fit on a single sheet, each sheet is an independent form. Therefore, items on different sheets cannot be combined in a single request for an operation.

Form 550 in FIG. 8 is a form that includes a send request segment, referred to as a Send section in the current implementation. Form 550 could be automatically created in response to form 500 in FIG. 7 if the check boxes in fields 526 and 530 were marked.

A form like form 550 could be created in many ways. In the current implementation, each automatically created form has an upper segment with a logo; a title (illustratively the form's date and time of creation); and machine readable form identifying information. Below this portion, a Send form like form 550 includes new recipient segment 552, document segment 556, options segment 558, and cover note segment 560. At the bottom of each automatically created form is a segment with the user's name and a date (not shown).

New recipient segment 552 includes fields for requesting transmission to a specified recipient. Field 590 has a rectangular outline within which a user can write a name or other identifying mnemonic of the recipient. Field 592 includes a check box that can be checked to request that the recipient be added to the recipient index in information database 322; thereafter, the identifier from field 590 can appear in the field for the recipient in recipient index segment 552 of subsequently created send forms, in the manner described in copending coassigned U.S. patent application Ser. No. 07/855,388, entitled "Using an Image from a Form in Automatic Creation of a Form or Sheet," incorporated herein by reference.

Field 594 includes boxes that can be checked to indicate the telephone number of the recipient's fax machine. If the box in field 592 is checked so that the recipient is added to the recipient index, this telephone number can subsequently be dialed in response to a single check box in subsequently created send forms in the manner described in copending coassigned U.S. patent application Ser. No. 07/856,107, entitled "Techniques for Automatic Form Creation by Combining Partial Operations," incorporated herein by reference. Field 594 can also include instructions and a small-scale example.

Document segment 556 includes a set of fields, each including an identifier of a document and a check box that can be checked to indicate the document. These fields can be arranged in a number of columns across an image, illustratively three columns in segment 556. The vertical length of document segment 556 can be adjusted to accommodate the resulting number of rows of fields.

The check boxes can be implemented for detection as described above. The user can check the boxes in fields 600, 602, and 604 to request facsimile transmission of document A, document B, and document C, respectively.

Options segment 558 similarly includes a set of fields, each including a box that can be checked to indicate an optional operation. For example, a user can check the box in field 610 to request a copy of a transmitted document also be saved in the user's in basket at the fax server; the box in field 612 to request that the transmission be done at a specified time, such as during the night when telephone rates are lower; or the box in field 614 to request automatic creation of a cover sheet for the transmission showing all recipients.

Cover note segment 560 includes field 620 with a rectangular outline, permitting a user to write a cover note for the cover sheet for the requested transmission. If image processing instructions 314 detect marks in field 620, a cover sheet is automatically created. Automatic creation of cover sheets including such a note is described in copending coassigned U.S. patent application Ser. No. 07/855,388, entitled "Using an Image from a Form in Automatic Creation of a Form or Sheet," incorporated herein by reference.

In creating form 550, a fax server also produces an identifier of form 550 and creates a definition of form 550. The identifier is used to produce the machine readable form identifying information and is also included in a list of forms in information database 322. The form definition is also stored in information database 322 such that the identifier can be used to obtain its definition.

The form definition could be implemented in many ways. In the current implementation, the form definition indicates the types and positions of segments on the form. The current implementation provides for several types of segments for requesting operations, referred to as Send sections, Retrieve sections, List Contents sections, Delete sections, and Store sections. A user-created form can include more than one section, but the current implementation allows only one of these section on an automatically created form. The automatically created form can also include, of course, segments like security code segment 506 and return address segment 510 in FIG. 7, as well as other appropriate segments as in FIG. 8.

Each type of segment has a respective set of smaller segments, and the form description also indicates the type, location, size, and contents of each smaller segment. Each smaller segment can, in turn, contain a set of still smaller segments, and the form description indicates each smaller segment's type, location, size, and contents. The types of a segment and of its smaller segments are also used by the Form action in determining how to retrieve and operate on its contents.

When form 550 is created, it can be transmitted to the telephone number indicated in field 510 in form 500. The telephone number could be modified if necessary as described in copending coassigned U.S. patent application Ser. No. 07/856,005, entitled "A System and Method for Implementing Telephone Dialing Rules," incorporated herein by reference.

Segment 650 in FIG. 9 is a List Contents section that can be used for requesting many types of forms. Segment 650 includes two types of fields— fields for indicating a container and fields for indicating a type of form section.

Fields 660, 662, 664, 666, 668, 670, and 672 are each for indicating a container whose contents can be listed on an automatically created form. A mark in the check box in field 660 requests a listing of everything in the In Basket. A mark in the check box in field 662 requests a listing of new items in the In Basket. A mark in the check box in field 664 requests a listing of the categories in the document index. A mark in the check box in field 666 requests a listing of the distribution lists in the recipient index. A mark in the check box in field 668 requests a listing of the items in a category called Category A, and a mark in the check box in field 670 requests a listing of the items in a category called Category B.

Fields 680, 682, and 684 are each for indicating a type of form section into which a container's contents are to be listed. Fields 680, 682, and 684 are for indicating a Retrieve section, a Send section, and a Delete section, respectively.

The current implementation applies the following rules in responding to various combinations of check marks in segment 650: If field 668 or 670 is checked, any of fields 680, 682, and 684 can be checked to obtain a Retrieve, Send, or Delete section listing the documents or forms in the indicated category; one form is created and returned for each type of section requested. Similarly, if field 660 or 662 is checked, any of fields 680, 682, and 684 can be checked to obtain a Retrieve, Send, or Delete section listing fax mail items.

If field 664 is checked, forms containing a Store section and a List Contents section are automatically created and returned—fields 680, 682, and 684 do not affect this response. If field 666 is checked, a form containing a List Contents section is automatically created and returned; in addition, if field 682 is checked, a for containing a Send section is also created and returned.

Segment 700 in FIG. 10 is a List Contents section that could be created in response to a version of segment 650 in FIG. 9 in which field 666 is checked. Like segment 650, segment 700 includes two types of fields—field for indicating a container and fields for indicating a type of form section.

Fields 710, 712, 714, 716, 718, and 720 are each for indicating a container whose contents can be listed on an automatically created form. A mark in the check box in field 710 requests a listing of everything in the special category All Documents, which includes all stored documents except help documents. A mark in the check box in field 712 requests a listing of everything in the special category All Forms, which includes all stored form definitions. A mark in the check box in field 714 requests a listing of everything in the special category Help Documents, which includes all stored help documents. A mark in the check box in one of fields 716, 718, and 720 requests a listing of everything in Category A, Category B, and Category C, respectively.

Fields 730, 732, and 734 are the same as fields 680, 682, and 684 in FIG. 9.

The current implementation applies the following rule in responding to of check marks in segment 700: If any category field is checked, any of fields 730, 732, and 734 can be checked to obtain a Retrieve, Send, or Delete section listing the documents or forms in the indicated category; one form is created and returned for each type of section requested.

Segment 750 in FIG. 11 is a List Contents section that could be created in response to a version of segment 650 in FIG. 9. Like segments 650 and 700, segment 750 includes two types of fields—field for indicating a container and fields for indicating a type of form section.

Fields 760, 762, and 764 are each for indicating a container whose contents can be listed on an automatically created form. A mark in the check box in field 760 requests a listing of everything in the special distribution list All Recipients, which includes all stored recipients. A mark in the check box in field 762 or 764 requests a listing of everything in a distribution list called DL-A or a distribution list called DL-B, respectively. Fields 762 and 764 each include a number indicating the number of recipients in the respective distribution list.

Fields 770, 772, and 774 are the same as fields 680, 682, and 684 in FIG. 9.

The current implementation applies the following rule in responding to check marks in segment 750: If any distribution list field is checked, field 772 can be checked to obtain a Send section listing the recipients in the indicated distribution list; field 770 can also be checked to obtain a specially created listing sheet that lists all recipients in the checked distribution list, together with stored information, if any, including fax machine telephone number, name, organization, voice telephone number, and e-mail and mailing addresses.

Various other segments could be obtained in response to user mark's in segment 650, following techniques similar to those described above.

D. Applications

The invention could be applied in many other ways other than in a system that performs facsimile transmissions. In general, the invention could be applied to any system in which images of forms can be transmitted, such as a system that includes a scanner and a printer.

E. Miscellaneous

The invention has been described mainly in relation to implementations in which a form is created requesting a facsimile transmission. The invention might also be implemented to produce various other types of forms, including forms to store a document in a database and to delete a document from a database. The invention is not limited to forms related to fax machines, although it is especially useful for such forms.

The invention has been described mainly in relation to implementations that transmit images of forms on paper sheets. The invention might also be implemented with forms on media other than paper, and with forms that are not on sheets as such, but on other types of marking media. For example, the invention might be implemented with a form on a marking surface on which a user can make marks that are electronically scanned.

The invention has been described in relation to software implementations, but the invention might be implemented with specialized hardware.

The invention has been described in relation to a software product that can be run on a personal computer with a fax card to provide fax services. In addition to the specific personal computer described, the invention could be implemented on any other personal computer, workstation, fax machine, or other system with suitable processing capabilities. In addition to the specific fax cards described, the current implementation could be extended to support other fax cards that can run in the Microsoft Windows environment and that have a programmable interface. In addition, the invention could be implemented with any other fax card or similar device for receiving and transmitting images, provided it has suitable processing capabilities. The invention could also be implemented in a dedicated server that provides fax services.

The invention has been described in relation to an implementation that also includes a user interface with a display and user input device such as a keyboard with a mouse. The user interface could be used to edit an automatically created form or to personalize a user profile to provide parameters used during automatic form creation. For example, a user could personalize the profile to indicate how fields appear within the segments of the automatically created form.

The invention has been described in relation to implementations in which a user can transmit a single blank sheet or a sheet with simple marks to obtain a one-sheet starter form and then request automatic form creation using the starter form. A larger number of blank sheets or sheets with simple marks could be used to obtain the starter form, and the starter form could include more than one sheet. Furthermore, a form other than a starter form could be used to request automatic form creation according to the invention, and the starter form itself could be used to request creation of such a form.

The invention has been described in relation to check boxes that are rectangular or two-sided, but any other appropriate type of marking field could be defined on a form, including a field defined by parentheses, a field defined by shading, and a field of any appropriate shape.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed:

1. A method of operating a system that includes:
   image input circuitry for obtaining data defining images as input;
   image output circuitry for providing data defining images as output;
   memory storing data;
   a processor connected for receiving data defining images from the image input circuitry and for providing data defining images to the image output circuitry; the processor further being connected for accessing the stored data in the memory;
   the stored data including item data indicating a number of items in relation to which the processor can perform an operation; the items including a first item;
   the method comprising:
   operating the processor to receive first input image data from the image input circuitry; the first input image data defining a first image set that shows a first form; the first form including a form request field that is marked to indicate a request for automatic creation of a form; the first input image data further including destination information indicating an image destination;
   in response to the form request field in the first input image data, operating the processor to use the item data to automatically produce created form data and to provide the created form data to the image output circuitry for transmission to the image destination; the created form data defining a second image set, the second image set showing a second form; the second form including, for each of the items, a respective request field for indicating a request for performance of the operation in relation to the item;
   operating the processor to receive second input image data from the image input circuitry; the second input image data defining a third image set, the third image set showing the second form with the first item's request field being marked to indicate a request for performance of the operation in relation to the first item; and
   in response to the first item's request field in the second image data, operating the processor to perform the operation in relation to the first item.

2. The method of claim 1 in which the image output circuitry is connected to provide a facsimile transmission; the destination information including a telephone number field in the first form, the telephone number field being marked to indicate a telephone number of a fax machine; the act of operating the processor to use the item data comprising using the indicated telephone number to transmit the created form data to the fax machine.

3. The method of claim 1 in which the image input circuitry is connected to receive a facsimile transmission and the image output circuitry is connected to provide a facsimile transmission; the first input image data being received by the image input circuitry from a fax machine, the destination information including telephone number data indicating a telephone number of the fax machine, the telephone number data not being part of the first form; the act of operating the processor to use the item data comprising using the indicated telephone number to transmit the created form data to the fax machine.

4. The method of claim 1 in which the operation is facsimile transmission, each item being a recipient to which a facsimile transmission can be made.

5. The method of claim 1 in which the operation is an operation that can be performed on data defining image sets, each item being an item of data defining an image set.

6. A method of operating a system that includes:
   image input circuitry for obtaining data defining images as input;
   image output circuitry for providing data defining images as output;
   memory storing data; and
   a processor connected for receiving data defining images from the image input circuitry and for providing data defining images to the image output circuitry; the processor further being connected for accessing the stored data in the memory;

the stored data including item data indicating a number of items in relation to which the processor can perform an operation; the items including a first item;

the stored data further including initial form data, the initial form data defining an initial form that includes a form request field for indicating a request for an automatically created form;

the method comprising:

operating the processor to receive first input image data from the image input circuitry; the first input image data defining a first image set that does not show a form; the first input image data further including first destination information indicating an image destination;

in response to the first input image data, operating the processor to use the initial form data to automatically produce first created form data and to provide the first created form data to the image output circuitry for transmission to the image destination indicated by the first destination information; the first created form data defining a second image set that shows the initial form;

operating the processor to receive second input image data from the image input circuitry; the second input image data defining a third image set that shows the initial form with the form request field being marked to indicate a request for an automatically created form; the second input image data further including second destination information indicating an image destination;

in response to the form request field in the second input image data, operating the processor to use the item data to automatically produce second created form data and to provide the second created form data to the image output circuitry for transmission to the image destination indicated by the second destination information; the second created form data defining a fourth image set, the fourth image set showing a second form; the second form including, for each of the items, a respective request field for indicating a request for performance of the operation in relation to the item;

operating the processor to receive third input image data from the image input circuitry; the third input image data defining a fifth image set, the fifth image set showing the second form with the first item's request field being marked to indicate a request for performance of the operation in relation to the first item; and in response to the first item's request field in the third input image data, operating the processor to perform the operation in relation to the first item.

7. The method of claim 6 in which the image input circuitry is connected to receive a facsimile transmission and the image output circuitry is connected to provide a facsimile transmission; the first image set showing a blank sheet; the first input image data being received by the image input circuitry from a fax machine, the first destination information including telephone number data indicating a telephone number of the fax machine; the act of operating the processor to use the initial form data comprising using the indicated telephone number to transmit the first created form data to the fax machine.

8. The method of claim 6 in which the image input circuitry is connected to receive a facsimile transmission and the image output circuitry is connected to provide a facsimile transmission; the first image set showing a sheet with simple marks; the first input image data being received by the image input circuitry from a fax machine, the first destination information including telephone number data indicating a telephone number of the fax machine; the act of operating the processor to use the initial form data comprising using the indicated telephone number to transmit the first created form data to the fax machine.

9. A system comprising:

image input circuitry for obtaining data defining images as input;

image output circuitry for providing data defining images as output;

memory storing data; and a processor connected for receiving data defining images from the image input circuitry and for providing data defining images to the image output circuitry; the processor further being connected for accessing the stored data in the memory;

the data stored in the memory comprising:

item data indicating a number of items in relation to which the processor can perform an operation; the items including a first item;

image receiving instruction data indicating input instructions the processor can execute to receive input image data from the image input circuitry; the input image data defining an image set; and operation performing instruction data indicating response instructions the processor can execute to perform operations in response to input image data;

when the input image data define a first image set that shows a first form including a form request field that is marked to indicate a request from a user for an automatically created form and the input image data also include information indicating an image destination, execution of the response instructions causing the processor to use the item data to automatically produce created form data and to provide the created form data to the image output circuitry for transmission to the image destination; the created form data defining a second image set, the second image set showing a second form; the second form including, for each of the items, a respective request field for indicating a request for performance of the operation in relation to the item;

when the input image data define a third image set that shows the second form with the first item's request field being marked to indicate a request for performance of the operation in relation to the first item, execution of the response instructions causing the processor to perform the operation in relation to the first item.

10. The system of claim 9 in which the input image circuitry is connected for receiving facsimile transmissions.

11. The system of claim 9 in which the output image circuitry is connected for providing facsimile transmissions.

12. An article of manufacture for use in a system that includes:

image input circuitry for obtaining data defining images as input;

image output circuitry for providing data defining images as output;

memory storing data;

a storage medium access device for accessing a medium that stores data; and a processor connected for receiving data defining images from the image input circuitry and for providing data defining images to the image output circuitry; the processor further being connected for accessing the data stored in the memory; the processor further being connected for receiving data from the storage medium access device;

the data stored in the memory comprising:
item data indicating a number of items in relation to which the processor can perform an operation; the items including a first item;

the article comprising:

a data storage medium that can be accessed by the storage medium access device when the article is used in the system; and data stored by the data storage medium so that the storage medium access device can provide the stored data to the processor when the article is used in the system; the stored data comprising:
image receiving instruction data indicating input instructions the processor can execute to receive input image data from the image input circuitry; the input image data defining an image set; and
operation performing instruction data indicating response instructions the processor can execute to perform operations in response to input image data;

when the input image data define a first image set that shows a first form including a form request field that is marked to indicate a request from a user for an automatically created form and the input image data also include information indicating an image destination, execution of the response instructions causing the processor to use the item data to automatically produce created form data and to provide the created form data to the image output circuitry for transmission to the image destination; the created form data defining a second image set, the second image set showing a second form; the second form including, for each of the items, a respective request field for indicating a request for performance of the operation in relation to the item;

when the input image data define a third image set that shows the second form with the first item's request field being marked to indicate a request for performance of the operation in relation to the first item, execution of the response instructions causing the processor to perform the operation in relation to the first item.

13. A method of operating a system that includes:
image input circuitry for receiving transmissions of data defining images as input;
image output circuitry for providing data defining images as output for transmission;
memory storing data;
a processor connected for receiving data defining images from the image input circuitry and for providing data defining images to the image output circuitry; the processor further being connected for accessing the stored data in the memory;
the stored data including recipient data indicating a plurality of recipients to which the processor can make a transmission through the image output circuitry; the recipients including a first recipient;
the method comprising:

operating the processor to receive first input image data from the image input circuitry; the first input image data defining a first image set that shows a first form; the first form including a form request field that is marked to indicate a request for automatic creation of a form; the first input image data further including destination information indicating an image destination;

in response to the form request field in the first input image data, operating the processor to use the recipient data to automatically produce created form data and to provide the created form data to the image output circuitry for transmission to the image destination; the created form data defining a second image set, the second image set showing a second form; the second form including, for each of the recipients, a respective request field for indicating a request for transmission of data defining an image set to the recipient;

operating the processor to receive second input image data from the image input circuitry; the second input image data defining a third image set, the third image set showing the second form with the first recipient's request field being marked to indicate a request for transmission of data defining an image set to the first recipient; and in response to the first recipient's request field in the second image data, operating the processor to provide data defining an image set to the image output circuitry for transmission to the first recipient.

14. A method of operating a system that includes:
image input circuitry for receiving transmissions of data defining images as input;
image output circuitry for providing data defining images as output for transmission;
memory storing data;
a processor connected for receiving data defining images from the image input circuitry and for providing data defining images to the image output circuitry; the processor further being connected for accessing the stored data in the memory;
the stored data including document data indicating a plurality of document image sets that the processor can provide to the image output circuitry for transmission; the document image sets including a first document image set;
the method comprising:
operating the processor to receive first input image data from the image input circuitry; the first input image data defining a first form image set that shows a first form; the first form including a form request field that is marked to indicate a request for automatic creation of a form; the first input image data further including destination information indicating an image destination;

in response to the form request field in the first input image data, operating the processor to use the document data to automatically produce created form data and to provide the created form data to the image output circuitry for transmission to the image destination; the created form data defining a second form image set, the second form image set showing a second form; the second form including, for each of the document image sets, a respective request field for indicating a request to provide data defining the document image set to the image output circuitry for transmission;

operating the processor to receive second input image data from the image input circuitry; the second input image data defining a third form image set, the third form image set showing the second form with the first document image set's request field being marked to indicate a request to provide data defining the first document image set to the image output circuitry for transmission; and in response to the first document image set's request field in the second image data, operating the processor to provide data defining the first document image set to the image output circuitry for transmission.

15. A method of operating a system that includes:

image input circuitry for receiving transmissions of data defining images as input;

image output circuitry for providing data defining images as output for transmission;

memory storing data;

a processor connected for receiving data defining images from the image input circuitry and for providing data defining images to the image output circuitry; the processor further being connected for accessing the stored data in the memory;

the stored data including item data indicating a number of items in relation to which the processor can provide data defining image sets to the image output circuitry for transmission; the items including a first item;

the method comprising:

operating the processor to receive first input image data from the image input circuitry; the first input image data defining a first image set that shows a first form; the first form including a form request field that is marked to indicate a request for automatic creation of a form; the first input image data further including destination information indicating an image destination;

in response to the form request field in the first input image data, operating the processor to use the item data to automatically produce created form data and to provide the created form data to the image output circuitry for transmission to the image destination; the created form data defining a second image set, the second image set showing a second form; the second form including, for each of the items, a respective request field for indicating a request in relation to the item, the request being a request to provide data defining image sets to the image output circuitry for transmission;

operating the processor to receive second input image data from the image input circuitry; the second input image data defining a third image set, the third image set showing the second form with the first item's request field being marked to indicate a request in relation to the first item, the request being a request to provide data defining image sets to the image output circuitry for transmission; and in response to the first item's request field in the second image data, operating the processor to provide data defining image sets to the image output circuitry for transmission, the processor providing the data for transmission in relation to the first item.

* * * * *